United States Patent Office 2,819,225
Patented Jan. 7, 1958

2,819,225

PROCESS FOR BREAKING PETROLEUM EMULSIONS EMPLOYING CERTAIN OXYALKYLATED AMINE-MODIFIED THERMOPLASTIC PHENOL-ALDEHYDE RESINS

Melvin De Groote, University City, Mo., assignor to Petrolite Corporation, Wilmington, Del., a corporation of Delaware No Drawing. Application March 25, 1954
Serial No. 418,785

10 Claims. (Cl. 252—344)

The present invention is a continuation-in-part of my co-pending application, Serial No. 398,631, filed December 16, 1953, now abandoned.

This invention relates to processes or procedures particularly adapted for preventing, breaking or resolving emulsions of the water-in-oil type, and particularly petroleum emulsions.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the invention.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Attention is directed to my co-pending application, Serial No. 398,631, filed December 16, 1953, which relates to a process for breaking petroleum emulsions employing a demulsifier including products obtained by condensing certain phenol aldehyde resins, therein described in detail, with certain basic secondary amines, also therein described in detail, and pyruvic aldehyde.

The present invention may be characterized in that it is concerned with a process for breaking petroleum emulsions employing demulsifiers including the above described reaction products of Serial No. 398,631 further oxyalkylated by means of certain monoepoxides, hereinafter described in detail.

The products obtained by oxyalkylation with a monoepoxide such as ethylene oxide, propylene oxide, butylene oxide or the like, can be subjected to further reaction with a product having both a nitrogen group and 1,2-epoxy group, such as 3-dialkylaminoepoxypropane. See U. S. Patent No. 2,520,093, dated August 22, 1950, to Gross.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics spray oils, water-repellent textile finishes; as lubricants, etc.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethyleneglycol diethylether, or a low molal alcohol, or a mixture to dissolve the appropriate product being examined and then mix with the equal weight of xylene, followed by addition of water. Such test is obviously the same for the reason that there will be two phases or vigorous shaking and surface activity makes its presence manifest. It is understood the reference in the hereto appended claims as to the use of xylene in the emulsification test includes such obvious variant.

Reference is made to U. S. Patent 2,499,368 dated March 7, 1950, to De Groote and Keiser. Attention is directed to that part of the text which appears in columns 28 and 29, lines 12 through 75, and lines 1 through 21, respectively. Reference is made to this test with the same force and effect as if it were herein included. This, in essence, means that the preferred product for resolution of petroleum emulsions of the water-in-oil type is characterized by the fact that a fifty-fifty solution in xylene, or its equivalent, when mixed with one to three volumes of water shaken will produce an emulsion.

For purpose of convenience, what is said hereinafter will be divided into five parts:

Part 1 is concerned with phenol-aldehyde resins suitable for condensation;

Part 2 is concerned with suitable secondary amines which can be employed in conjunction with the resins in the condensation procedure;

Part 3 is concerned with the condensation procedure as such;

Part 4 is concerned with reactions involving the intermediates obtained in the manner described in Part 3, preceding, and certain alpha-beta monoepoxides having not over 4 carbon atoms;

Part 5 is concerned with the resolution of petroleum emulsions of the water-in-oil type by means of the previously described chemical compounds or reaction products.

PART 1

This part is concerned with the preparation of phenol-aldehyde resins of the kind described in detail in U. S. Patent No. 2,499,370, dated March 7, 1950, to De Groote and Keiser, with the following qualifications; said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U. S. Patent No. 2,499,370, reference is made also to the following U. S. Patents: Nos. 2,499,365, 2,499,366, and 2,499,367, all dated March 7, 1950, to De Groote and Keiser. These patents, along with the other two previously mentioned patents, describe phenolic resins of the kind herein employed as initial materials.

For practical purposes, the resins having 4 to 12 carbon atoms are most satisfactory, with the additional $C_{14}$ carbon atoms also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U. S. Patent No. 2,499,365, dated March 7, 1950, to De Groote and Keiser, such as Example 71a.

Reference has been made to an earlier formula which was in essence an over-simplification representing a phenol-formaldehyde resin. Actually, some other aldehyde, such as acetaldehyde, propionaldehyde, or butyraldehyde, may be used. The resin unit can be exemplified thus:

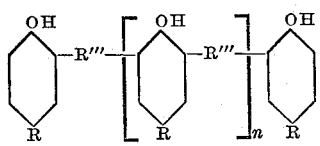

in which $R'''$ is the divalent radical obtained from the particular aldehyde employed to form the resin.

As previously stated, the preparation of resins of the kind herein employed as reactants is well known. See U. S. Patent No. 2,499,368, dated March 7, 1950, to De Groote and Keiser. Resins can be made using an acid catalyst or basic catalyst or a catalyst showing neither acid nor basic properties in the ordinary sense, or without any catalyst at all. It is preferable that the resins employed be substantially neutral. In other words, if prepared by using a strong acid as a catalyst, such strong acid should be neutralized. Similarly, if a strong base is used as a catalyst, such strong acid should be neutralized. Similarly, if a strong base is used as a catalyst it is preferable that the base be neutralized although we have found that sometimes the reaction described proceeded more rapidly in the presence of a small amount of free base. The amount may be as small as a 200th of a percent and as much as a few tenths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins we found no reason for using other than those which are lowest in price and most readily available commercially. For purpose of convenience suitable resins are characterized in the following table:

TABLE I

| Example number | R | Position of R | R''' derived from | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 2

As noted previously, a variety of secondary amines free from a primary amino group may be employed. These amines fall into five categories, as indicated previously.

One category consists of strongly basic secondary monoamides free from hydroxyl groups whose composition may be indicated thus:

in which $R'$ represents a monovalent alkyl, alicyclic, arylalkyl radical and may be heterocyclic in a few instances as in the case of piperidine and a secondary amine derived from furfurylamine by methylation or ethylation, or a similar procedure.

Another example of a heterocyclic amine is, of course, morpholine.

The secondary amines most readily available are, of course, amines such as dimethylamine, methylethylamine, diethylamine, dipropylamine, ethylpropylamine, dibutylamine, diamylamine, dihexylamine, dioctylamine, and dinonylamine. Other amines include bis(1,3-dimethylbutyl) amine. There are, of course, a variety of primary amines which can be reacted with an alkylating agent such as dimethyl sulfate, diethyl sulfate, an alkyl bromide, an ester of sulfonic acid, etc., to produce suitable amines within the herein specified limitations. For example, one can methylate alpha-methylbenzylamine, or benzylamine itself, to produce a suitable reactant. Needless to say, one can use secondary amines such as dicyclohexylamine, dibutylamine or amines containing one cyclohexyl group and one alkyl group, or one benzyl group and one alkyl group, such as ethylcyclohexylamine, ethylbenzylamine, etc.

Other suitable compounds are exemplified by $$(C_2H_5OC_2H_4OC_2H_4)_2NH$$
$$(C_8H_{17}OC_2H_4OC_2H_4OC_2H_4)_2NH$$
$$(C_4H_9OCH_2CH(CH_3)O(CH_3)CHCH_2)_2NH$$
$$(CH_3OCH_2CH_2OCH_2CH_2OCH_2CH_2)_2NH$$
$$(CH_3OCH_2CH_2CH_2CH_2CH_2CH_2)_2NH$$

Other somewhat similar secondary amines are those of the composition $$\begin{array}{c} R-O(CH_2)_2 \\ \phantom{R-O(CH_2)_2}\diagdown \\ \phantom{R-O(CH_2)_2}\phantom{\diagdown}NH \\ \phantom{R-O(CH_2)_2}\diagup \\ R-O(CH_2)_3 \end{array}$$

as described in U. S. Patent No. 2,375,659, dated May 8, 1945, to Jones et al. In the above formula R may be methyl, ethyl, propyl, amyl, octyl, etc.

Other amines can be obtained from products which are sold in the open market, such as may be obtained by alkylation of cyclohexylmethylamine or the alkylation of similar primary amines, or, for that matter, amines of the kind described in U. S. Patent No. 2,482,546, dated September 20, 1949, to Kaszuba, provided there is no negative group or halogen attached to the phenolic nucleus. Examples include the following: beta-phenoxyethylamine, gamma-phenoxypropylamine, beta-phenoxy-alpha-methylethylamine, and beta-phenoxypropylamine.

Other suitable amines are the kind described in British Patent No. 456,517 and may be illustrated by $$C_{12}H_{25}-O-CH_2-CH_2-O-CH_2-CH_2-NH-CH_3$$

The secondary category represents secondary amines which are hydroxylated monoamines. These may be illustrated by diethanolamine, methylethanolamine, dipropanolamine, dibutanolamine and ethylpropanolamine. Suitable primary amines which can be so converted into secondary amines include butylamine, amylamine, hexylamine, higher molecular weight amines derived from fatty acids, cyclohexylamine, benzylamine, furfurylamine, etc.

Other suitable amines include 2-amino-1-butanol, 2-amino-2-methyl-1-propanol, 2-amino-2-methyl-1,3-propanediol, 2-amino-2-ethyl-1,3-propanediol, and tris-(hydroxylmethyl)-aminoethane. Another example of such amines is illustrated by 4-amino-4-methyl-2-pentanol.

Other suitable compounds are the following:

$$\begin{array}{c} (C_2H_5OC_2H_4OC_2H_4) \\ \phantom{(C_2H_5OC_2H_4OC_2H_4)}\diagdown \\ \phantom{(C_2H_5OC_2H_4OC_2H_4)}\phantom{\diagdown}NH \\ \phantom{(C_2H_5OC_2H_4OC_2H_4)}\diagup \\ HOC_2H_4 \end{array}$$

$$\begin{array}{c} (C_2H_5OC_2H_4OC_2H_4OC_2H_4) \\ \phantom{xxxxxxxxxxxxxxxxxxxxx}\diagdown \\ \phantom{xxxxxxxxxxxxxxxxxxxxx}\phantom{\diagdown}NH \\ \phantom{xxxxxxxxxxxxxxxxxxxxx}\diagup \\ HOC_2H_4 \end{array}$$

$$\begin{array}{c} (C_4H_9OCH_2CH(CH_3)O(CH_3)CHCH_3) \\ \phantom{xxxxxxxxxxxxxxxxxxxxxxxxxxxxxxxxx}\diagdown \\ \phantom{xxxxxxxxxxxxxxxxxxxxxxxxxxxxxxxxx}\phantom{\diagdown}NH \\ \phantom{xxxxxxxxxxxxxxxxxxxxxxxxxxxxxxxxx}\diagup \\ HOC_2H_4 \end{array}$$

$$\begin{array}{c} (CH_3OCH_2CH_2OCH_2CH_2OCH_2CH_3) \\ \phantom{xxxxxxxxxxxxxxxxxxxxxxxxxxxxxxxxx}\diagdown \\ \phantom{xxxxxxxxxxxxxxxxxxxxxxxxxxxxxxxxx}\phantom{\diagdown}NH \\ \phantom{xxxxxxxxxxxxxxxxxxxxxxxxxxxxxxxxx}\diagup \\ HOC_2H_4 \end{array}$$

$$\begin{array}{c} (CH_3OCH_2CH_2CH_2CH_2CH_2CH_3) \\ \phantom{xxxxxxxxxxxxxxxxxxxxxxxxxxxxxxxxx}\diagdown \\ \phantom{xxxxxxxxxxxxxxxxxxxxxxxxxxxxxxxxx}\phantom{\diagdown}NH \\ \phantom{xxxxxxxxxxxxxxxxxxxxxxxxxxxxxxxxx}\diagup \\ HOC_2H_4 \end{array}$$

or comparable compounds having two hydroxylated groups of different lengths as in $$\begin{array}{c} (HOCH_2CH_2OCH_2CH_2OCH_2CH_2) \\ \phantom{xxxxxxxxxxxxxxxxxxxxxxxxxxxxx}\diagdown \\ \phantom{xxxxxxxxxxxxxxxxxxxxxxxxxxxxx}\phantom{\diagdown}NH \\ \phantom{xxxxxxxxxxxxxxxxxxxxxxxxxxxxx}\diagup \\ HOC_2H_4 \end{array}$$

Other examples of suitable amines include alpha-methylbenzylamine and monoethanolamine; also amines obtained by treating cyclohexylmethylamine with one mole of an oxyalkylating agent as previously described; beta-ethylhexylbutanolamine, diglycerylamine, etc. Another type of amine which is of particular interest because it includes a very definite hydrophile group includes sugar amines such as glucamine, galactamine and fructamine, such as N-hydroxyethylglucamine, N-hydroxyethylgalactamine, and N-hydroxyethylfructamine.

Other suitable amines may be illustrated by $$\begin{array}{c} CH_3 \\ | \\ HO.CH_2.C.CH_2OH \\ | \\ NH \\ | \\ HO.CH_2.C.CH_2OH \\ | \\ CH_3 \end{array}$$

$$\begin{array}{c} CH_3 \\ | \\ CH_3.C.CH_2OH \\ | \\ NH \\ | \\ CH_3.C.CH_2OH \\ | \\ CH_3 \end{array}$$

See, also, corresponding hydroxylated amines which can be obtained from rosin or similar raw materials and described in U. S. Patent No. 2,510,063, dated June 6, 1950, to Bried. Still other examples are illustrated by treatment of certain secondary amines, such as the following, with a mole of an oxyalkylating agent as described; phenoxyethylamine, phenoxypropylamine, phenoxyalphamethylethylamine, and phenoxypropylamine.

Polyamines free from a hydroxyl group may be illustrated by the following:

$$\begin{array}{c} CH_3 \phantom{xxxxxxxxxxxxxxxx} CH_3 \\ \diagdown \phantom{xxxxxxxxxxxxxxxxxx} \diagup \\ \phantom{x} HC_2H_4NC_2H_4N \\ \diagup \phantom{xxx} H \phantom{xxxxxxx} \diagdown \\ H \phantom{xxxxxxxxxxxxxxxxxxx} H \end{array}$$

$$(CH_3)_2NC_2H_4\underset{H}{N}C_2H_4N(CH_3)_2$$

$$\begin{array}{c} C_2H_5 \phantom{xxxxxxxxxxxxxx} C_2H_5 \\ \diagdown \phantom{xxxxxxxxxxxxxxxxxx} \diagup \\ NC_2H_5NC_2H_4N \\ \diagup \phantom{xxx} H \phantom{xxxxxxx} \diagdown \\ H \phantom{xxxxxxxxxxxxxxxxxxx} H \end{array}$$

$$\begin{array}{c} CH_3 \phantom{xxxxxxxxxxxxxx} CH_3 \\ \diagdown \phantom{xxxxxxxxxxxxxxxxxx} \diagup \\ NC_2H_4OC_2H_4N \\ \diagup \phantom{xxxxxxxxxxxxxxxx} \diagdown \\ H \phantom{xxxxxxxxxxxxxxxxxxx} H \end{array}$$

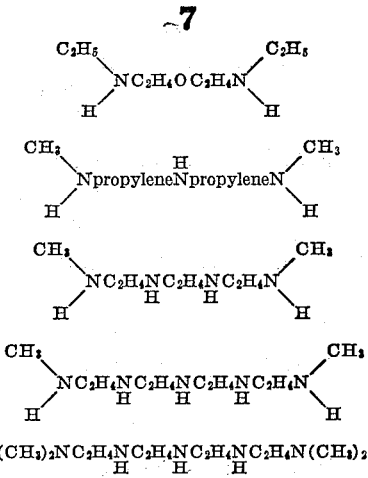

The fourth category consists of polyamines having hydroxylated groups which may be characterized by the following:

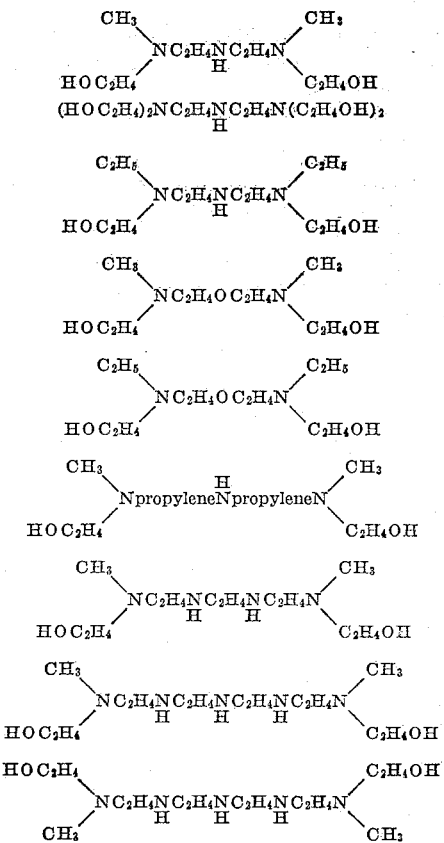

Suitable cyclic amidines which may or may not have a hydroxyl group but are free from primary amino groups may be illustrated by the following:

2-undecylimidazoline
2-heptadecylimidazoline
2-oleylimidazoline
1-N-decylaminoethyl,2-ethylimidazoline
2-methyl,1-hexadecylaminoethylaminoethylimidazoline
1-dodecylaminopropylimidazoline
1-(stearoyloxyethyl)aminoethylimidazoline
1-stearamidoethylaminoethylimidazoline
1-(N-dodecyl)-acetamidoethylaminoethylimidazoline
2-heptadecyl,4,5-dimethylimidazoline
1-dodecylaminohexylimidazoline
1-stearoyloxyethylaminohexylimidazoline
2-heptadecyl,1-methylaminoethyl tetrahydropyrimidine
4-methyl,2-dodecyl,1-methylaminoethylaminoethyl tetrahydropyrimidine A compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as

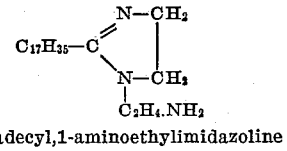

2-heptadecyl,1-aminoethylimidazoline which can be reacted with a single mole of ethylene oxide, for example, to produce the hydroxy ethyl derivative of 2-heptadecyl,1-aminoethylimidazoline, which can be illustrated by the following formula:

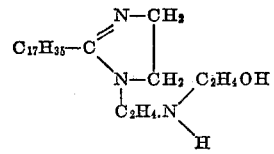

Other reactants may be employed in connection with an initial reactant of the kind described above, to wit, 2-heptadecyl,1-aminoethylimidazoline; for instance, reaction with an alkylene imine such as ethylene imine, propylene imine, etc. If reacted with ethylene imine the net result is to convert a primary amino radical into a secondary amino radical and also introduces a new primary amine group. If ethylene imine is employed, the net result is simply to convert 2-heptadecyl,1-aminoethylimidazoline into 2-heptadecyl,1-diethylenediamineoimidazoline. However, if propylene imine is used the net result is a compound which can be considered as being derived hypothetically from a mixed polyalkylene amine, i. e., one having both ethylene groups and a propylene group between nitrogen atoms.

PART 3

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

The herein described amine-modified resins are obtained from pyruvic aldehyde and not formaldehyde. Generally speaking, the objective in the preparation of these amine-modified resins is to obtain a heat-convertible compound even by using formaldehyde. It is not necessary to point out the complications involved when pyruvic aldehyde is used. See, for example, U. S. Patent No. 2,031,557 to Bruson. Since the condensation products obtained are not heat-convertible and since temperature up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, we have found it convenient to use a solvent and particularly one which can be removed readily at a comparatively moderate temperature, for instance, at 150° C. A suitable solvent is usually benzene, xylene or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethyleneglycol. One can also use a mixture of benzene or xylene and such oxygenated solvents. Note that the use of such oxygenated solvent is not required in the sense that it is not necessary to use an initial resin which is soluble only in an oxygenated solvent as noted, and it is not necessary to have a single phase system for reaction.

Pyruvic aldehyde is available as a 36% aqueous solution. In this way it is comparable to formaldehyde which is available as a 37% aqueous solution, and is sometimes used in more dilute form. I have found no difficulty in promoting the condensation reaction although at times it is desirable to add some solvent having a common solvent effect. Thus an oxygenated solvent may or may not be employed. Such solvent may be employed in combination with a hydrocarbon solvent such as xylene. However, if the reaction mass is going to be subjected to some further reaction where the solvent may be objectionable as in the case of ethyl or hexyl alcohol, and if there is to be subsequent oxyalkylation, then, obviously, the alcohols should not be used or else they should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the condensation products obtained are invariably dark and particularly reddish or dark red in color.

By and large, the melting point of the condensate is apt to be higher than of comparable condensates obtained by the use of formaldehyde or furfural. As has been suggested previously, this apparently is due to the difunctional property of pyruvic aldehyde. Indeed, depending on the resin selected and the amine selected the condensate product or reaction mass on a solvent-free basis is apt to be harder than the original resin itself. This is particularly true when all the amino hydrogen atoms present in the amine have entered into reaction.

The products obtained, depending on the reactants selected, may be water-insoluble, or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been mentioned previously; (a) is the solvent to remain in the reaction mass without removal? (b) is the reaction mass to be subjected to further reaction in which the solvent, for instance, an alcohol, either low boiling or high boiling, might interfere as in the case of oxyalkylation? and the third factor is this (c) is an effort to be made to purify the reaction mass by the usual procedure as, for example, a water-wash to remove any unreacted low molal soluble amine, if employed and present after reaction? Such procedures are well known and, needless to say, certain solvents are more suitable than others. Everything else being equal, we have found xylene the most satisfactory solvent.

I have found no advantage in using a low temperature, approximately room temperature, at the start of the reaction although this is sometimes done purely as a matter of convenience. Indeed, using pyruvic aldehyde I have usually done nothing more than prepare the reaction mixture, add a suitable amount of xylene, and reflux for approximately 3 to 6½ hours at temperatures varying, as the case may be, from 135° to 160° C. Where the amine has a comparatively low basicity I have sometimes added to small amount or approximately 1% of sodium methylate.

However, using a xylene-benzene mixture, for instance, approximately 170 parts of benzene and 35 parts of xylene, and a phase-separating trap to eliminate water, I have found that I could employ temperatures between 90° and 100° C., and eliminate the water of condensation by refluxing at this temperature. However, I have found no particular advantage in using this low temperature over and above the high temperature previously noted.

*Example 1b*

The resin employed was the one previously designated as 28a and had a molecular weight of approximately 600. 175 grams of this resin were dissolved in slightly more than an equal weight of xylene and 61 grams of di-isopropanolamine added. 61.5 grams of methyl glyoxal (36% aqueous solution) were added and the mixture stirred for about 30 minutes and then the temperature allowed to rise to 144° C., where it was allowed to reflux for 6.75 hours. During this refluxing period a phase-separating trap was used to remove the water of formation. At the end of this time the reaction was complete and the product was obtained in the form of a xylene solution. A small sample was evaporated to eliminate the xylene. The resultant product was a highly viscous, tacky material, being black in color with a reddish tinge.

Similar products were prepared as indicated in the following table:

| Ex. No. | Resin amt., grams | Secondary amine | Amt., grams | Methyl glyoxal (36% aq. sol.), grams | Solvent (xylene unless otherwise noted), grams | Time period, hrs. | Max. temp. during reaction, °C. |
|---|---|---|---|---|---|---|---|
| 1b | 175 | Di-isopropanolamine | 61 | 61.5 | 180 | 6.75 | 144 |
| 2b | 150 | Di-n-butylamine | 65 | 50.0 | 165 | 6.5 | 158 |
| 3b | 150 | Di-ethylamine | 37 | 50.0 | 156 | 5.5 | 145 |
| 4b | 150 | Di-cyclohexylamine | 91 | 50.0 | 153 | 6.75 | 168 |
| 5b | 300 | Morpholine | 87 | 100.0 | 310 | 5.75 | 143 |
| 6b | 300 | Di-2-ethylhexylamine | 241 | 100.0 | 288 | 5.00 | 165 |
| 7b | 225 | Bis-(1,3-dimethylbutyl)amine | 139 | 75.0 | 237 | | |
| 8b | 225 | Di-isopropanolamine | 100 | 75.0 | 233 | 3.5 | 165 |
| 9b | 225 | a-Methylbenzylethanolamine | 124 | 75.0 | 238 | 3.5 | 160 |
| 10b | 225 | Di-ethanolamine | 79 | 75.0 | 230 | 3.0 | 161 |
| 11b | 225 | Aminoethyl ethanolamine | 78 | 75.0 | 235 | 2.5 | 145 |
| 12b | 225 | Diethanolamine | 79 | 75.0 | **55-170 | 3.5 | 105 |
| 13b | 225 | ...do... | 79 | 75.0 | **55-170 | 3.5 | 100 |
| 14b | 225 | ...do... | 131.5 | 133.0 | **55-170 | 3.5 | 101 |
| 15b | 225 | Diisopropanolamine | 174 | 133.0 | 240 | 2.0 | 125 |
| 16b | 236 | Di-isopropylamine | 61 | 61.5 | 238 | 7.5 | 150 |
| 17b | 197 | Di-n-butylamine | 65 | 50.0 | 195 | 6.5 | 165 |
| 18b | 197 | Di-ethylamine | 37 | 50.0 | 205 | 5.5 | 150 |
| 19b | 197 | Di-cyclohexylamine | 91 | 50.0 | 180 | 6.75 | 155 |
| 20b | 393 | Morpholine | 87 | 100 | 380 | 7.0 | 160 |
| 21b | 393 | Di(2-ethylhexyl)amine | 241 | 100 | 399 | 5.75 | .65 |
| 22b | 197 | N-methylaniline | 54 | 50.0 | 101 | 4.5 | 168 |
| 23b | 295 | Di (beta-phenylethyl)amine | 169 | 75.0 | 303 | 5.0 | 160 |
| 24b | 295 | Di-isopropanolamine | 100 | 75.0 | 205 | 3.75 | 160 |
| 25b | 225 | Di-ethanolamine | 79 | 75.0 | 300 | 3.0 | 140 |
| 26b | 188 | Di-isopropylamine | 61 | 61.5 | 222 | 7.75 | 166 |
| 27b | 188 | Di-n-butylamine | 65 | 50.0 | 180 | 6.0 | 150 |
| 28b | 188 | Di-ethylamine | 37 | 50.0 | 178 | 6.5 | 162 |
| 29b | 188 | Di-cyclohexylamine | 91 | 50.0 | 194 | 7.5 | 160 |
| 30b | 374 | Morpholine | 87 | 100 | 374 | 7.0 | 170 |
| 31b | 188 | Di-(2-ethylhexyl)amine | 241 | 100 | 379 | 5.0 | 165 |
| 32b | 280 | N-methylaniline | 54 | 50 | 200 | 6.0 | 168 |
| 33b | 280 | Di-(beta-phenylethyl)amine | 169 | 75 | 295 | 6.5 | 155 |
| 34b | 280 | Di-isopropanolamine | 100 | 75 | 273 | 4.0 | 158 |
| 35b | 280 | Di-ethanolamine | 79 | 75 | 273 | 3.0 | 155 |

NOTE.—In the above examples no catalyst was added. In some duplications of the above small amounts of catalyst were added up to 1% to 2% of either powdered caustic soda or powdered sodium methylate. No advantage was noted in the use of a catalyst provided the amine was sufficiently basic.

In Examples 12b, 13b and 14b indicated by the double asterisk the solvent was a mixture of 170 parts of benzene and 55 parts of xylene.

The molal ratio of resin to amine to aldehyde was 1 to 2 to 1, except in Examples 14b and 15b where the ratio was 1 to 3.5 to 1.75 in both instances.

In Examples 1b through 15b the resin employed was the one identified as Example 28a. In Examples 16b through 25b the resin employed was the one identified as Example 32a, and in Examples 26b through 35b the resin employed was identified as Example 39a.

Returning now to consideration of the structure of the condensate it becomes obvious that one could obtain ring compounds. Using the abbreviated formula previously applied, the simplest ring could be shown thus:

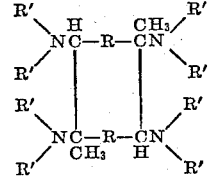

Obviously, one could have rings with a larger number of members in the ring to say nothing of complications involving alkanol radicals, for instance, the elimination of a hydrogen atom from the alkanol hydroxyl group. Furthermore, the situation becomes even more complicated if the ratios are changed to correspond to ratios described in my co-pending application, Serial No. 376,240, filed August 24, 1953, now Patent No. 2,792,365 dated May 14, 1957. In this particular instance there are described a number of complicated condensates in which 3½ moles of diethanolamine, or the like, 3½ moles of formaldehyde, and one mole of the phenol-aldehyde resin, are employed. If corresponding condensates are prepared, replacing 3½ moles of formaldehyde by 1¾ moles of pyruvic aldehyde, a variety of compounds are obtained which have unusual structure but are still organic solvent-soluble and susceptible to oxyalkylation. Indeed, another variety of somewhat more complicated materials are obtained by using as the amine reactant di(hydroxyethyl)N,N'-ethylene diamine having the following structure:

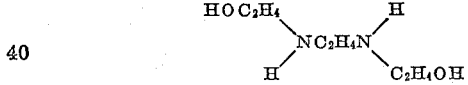

An initial product can be made treating the amine as if it were nothing more than a hydroxylated monoamine. Subsequently pyruvic aldehyde may be added up to, for example, the amount originally employed with the production of linear polymers and in some instances cross-linking. It is understood that regardless of what amine is used the final product obviously is, and must be, organic solvent-soluble. The primary objective is to obtain a condensate which is organic solvent-soluble and not an infusible resin. Such condensate is particularly valuable for oxyalkylation. The products so obtained find utility in various arts.

See my co-pending application, Serial No. 383,928, filed October 2, 1953, now Patent No. 2,792,366 dated May 14, 1957. This particular application is essentially the same as the instant application except that glyoxal is used instead of pyruvic aldehyde. It is well known that pyruvic aldehyde combines with alcohols to form dialkyl and tetra-alkyl acetals. There is some indication that polymerization may take place or at least some reaction involving one of the hydrogens of the methyl radical; all of which simply is an indication of a more complicated type of reaction which may take place under certain conditions when pyruvic aldehyde (methylglyoxal) is used in comparison to glyoxal.

PART 4

At the present time there are available a number of alkylene oxides, particularly ethylene oxide, or propylene oxide and butylene oxide, either as a single isomer or as a mixture of isomers. Glycide is available, or readily prepared. The same applies to methylglycide.

Oxyalkylation with any of the aforementioned alkylene oxides is comparatively simple, in light of present day knowledge. In fact, it is stated briefly in U. S. Patent No. 2,636,038, dated April 21, 1953, to Brandner, in the following language: ". . . The compounds . . . are preparel by the addition reaction between alkylene oxides and substituted oxazolines of the group named hereinbefore. The addition reaction is advantageously carried out at elevated temperature and pressure and in the presence of an alkaline catalyst."

As to a more complete description of oxyalkylation procedure reference is made to U. S. Patent 2,629,706, dated February 24, 1953, to De Groote and Keiser. See particularly the subject matter which appears in column 7 of said patent.

Propylene oxide and butylene oxide react somewhat more slowly than ethylene oxide and may require a somewhat higher temperature, somewhat greater agitation, or an increased amount of alkaline catalyst, such as finely powdered sodium hydroxide or sodium methylate. If the product to be subjected to oxyalkylation is xylene-soluble or soluble in any one of a number of inert solvents, there is no particular difficulty involved. The same is true if the product is a liquid at oxyalkylation temperatures. If it is not soluble or a liquid then in some cases initial oxyalkylation can be accomplished by means of an alkylene carbonate, such as ethylene carbonate or propylene carbonate which has a solubility effect as well as acting as an oxyalkylation agent. As soon as a suitable product is obtained by the use of a carbonate further reaction can be completed with the oxide. An alternate procedure sometimes employed with insoluble materials is to reduce the products to an extremely finely ground powder and oxyalkylate during suspension using particularly vigorous agitation.

All these procedures have been described repeatedly in the literature and, as a matter of fact, suitable operational directions are available from any one of several makers of alkylene oxides.

*Example 1c*

Due to their ready availability, the bulk of the oxyalkylation derivatives were prepared from ethylene oxide, propylene oxide, butylene oxide, or a mixture of the same. Generally speaking, the autoclaves or oxyalkylators employed ranged from approximately 2 gallons in size to approximately 20 gallons in size. The general procedure was to start with a fairly small sample; for instance, approximately 2000 grams, of the product to be oxyalkylated and 1000 grams of a solvent such as xylene, or a high-boiling aromatic solvent, or the diethylether of ethyleneglycol, or a mixture of these solvents. Powdered caustic soda, or sodium methylate, were added as a catalyst in an amount generally not over 2%, and more catalyst was added if the amount dropped to ½% or less. Initial oxyalkylation generally started by adding 50% by weight, 100% by weight, 200% by weight, 300% by weight, 500% by weight, etc., until at least ten times as much oxide had been added, at least in some examples. Excellent compounds or suitable raw materials have been obtained by adding as much as 50 parts by weight of oxide to one part of the initial reactant. In some instances the same examples were repeated and then reacted with one or more oxides; for instance, in the table which follows there are examples where an oxyethylated product was oxypropylated subsequently, or vice-versa. Comparatively small samples, for instance, one to five grams, were taken at various stages and tested for emulsifiability factor and also for demulsifying effect on crude oil emulsions. The tabular data do not reflect the slight discrepancy due to the sample withdrawal.

More specifically then, 15 pounds (6,500 grams) of the condensate previously identified as Example 1b, were mixed with an equal weight of solvent (being xylene in this series). The mixture was placed in a small autoclave together with one and one-half pounds (675 grams) of finely powdered caustic soda, and stirred, and the temperature raised to approximately 125°–130° C. 5 pounds (2270 grams) of ethylene oxide were added in approximately 30 minutes. The pressure during the oxyalkylation was about 10 to 15 pounds per square inch. The resultant product was a fluid having a reddish black cast. Except for the withdrawal of a few grams for examination, the product was then subjected to further oxyalkylation with another 5 pounds of ethylene oxide and without the addition of any more catalyst or any more solvent.

Note what is said in regard to these examples and subsequent examples in the text immediately following, and in the tables.

A number of additional examples appear in tabular form in the five tables immediately following, to wit, Tables III, IV, V, VI and VII. These are self-explanatory, particularly in regard to the first three tables. The last two require a little more careful examination. This is due to an effort to condense the data and not burden the text with an unduly large volume of detail.

Due to the fact that various size quantities are used the ratios sometimes appear in grams or kilograms and sometimes in pounds. When pounds are used the designation "#" is included.

In Tables III, IV and V successive stages of oxyalkylation are shown. Small samples of a few grams were withdrawn and tested for solubility and also for demulsification effectiveness. The withdrawal of such small samples was ignored. In some instances the example was repeated and used subsequently for reaction with one or more other oxides. In some instances the product so obtained in the first stage of oxyalkylation represented a comparatively large quantity and was subdivided perhaps into one-half or even a smaller fraction, and then this smaller fraction only subjected to oxyalkylation with another oxide. As previously noted, no further explanation is required in regard to the first three tables.

In the fourth table, Table VI, it is to be noted that Example 1f is derived from Example 6c. Referring to Example 6c it will be noted this was derived originally from oxyalkylation-susceptible compound Example 1b. In Example 6c, oxyalkylation-susceptible compound Example 1b had already been treated with ethylene oxide. Thus, in Table VI, although the oxyalkylation-susceptible compound is properly designated as Example 6c for the reason it is now the reactant subjected to oxypropylation, the oxyalkylation-susceptible compound as far as reference to weight goes (in this instance 15 pounds) goes back to the original compound Example 1b. This is obvious, and is even more obvious for the reason that it is subsequently emphasized in connection with the weight ratio, as explained subsequently.

It will be noted also that in the fourth column in Table VI the oxide used is marked as indicated and in each instance the oxide employed in this second stake is shown, in two instances in Table VI being propylene oxide and in one instance being ethylene oxide.

Bearing in mind what is said in regard to Example 1f being derived from Example 6c, which in turn was derived from Example 1b plus ethylene oxide, it should be noted that this table does not, as far as the first four columns go, reflect the amount of oxide which was added in the initial or earlier stage. As previously noted, this does not cause confusion and, in fact, permits holding the data to a minimum in light of what is said next.

Referring now to columns seven, eight, nine and ten which are concerned with composition at the end, it will be noted that these data do take into consideration the amount of oxide added initially as well as the oxide during the second stage. Thus, although this shows the propylene oxide added it also shows the original ethylene oxide as representing the five-to-one weight ratio based on the oxyethylation of the first stage. This can be stated perhaps more simply in the following way: On initial examination the table shows that Example 1f was derived from Example 6c. As to the composition of Example 6c one need only note that in the seventh column it shows that 1125 grams of butylene oxide were added and the weight ratio to the oxyalkylation-susceptible compound Example 1b was .5 to 1, but it also shows that the weight ratio of the ethylene oxide at the same stage was three to one. Thus, without even checking back to a prior table it is obvious the initial material, Example 6c, subjected to a second oxyalkylation step, consisted of a product in which one pound of the oxyalkylation-susceptible compound was combined with 3 pounds by weight of ethylene oxide, prior to oxypropylation.

Since 1125 grams of butylene oxide were used which is equivalent to 2.7 pounds, which was equivalent to one-half part by weight of the oxyalkylation-susceptible compound Example 1b, it means in essence that 5.4 pounds of the oxyalkylation-susceptible compound had previously been combined with three times its weight of ethylene oxide, i. e., 16.2 pounds of ethylene oxide and is now being combined with one-half its weight, 2.7 pounds, of butylene oxide. Referring back to Example 6c it will be noted that the ratio of ethylene oxide to initial oxyalkylation-susceptible compound was three to one.

All the data in Tables VI and VII are presented in the same way. We find this is the most simple and concise tabular presentation that yet has been developed after a considerable series of experimentations, and reports in table form. This is true even where three oxides were employed as for instance in Example 1g in Table VII. Example 1g was obtained from Example 5f in Table VI. Example 5f, as indicated, was obtained by an oxypropylation of Example 1f, and Example 1f, as previously noted, was obtained from Example 6c. The preparation of Example 6c from Example 1b has been discussed in considerable detail in the previous text. Again it is to be noted that in the tables the ratios of the oxide to the initial product prior to oxyalkylation is shown so there is no question as to the composition of each example although considerable data have been presented in what is a comparatively condensed and readily understandable form.

Note what is said in regard to the color of the products in the tables. For most industrial purposes there is no objection to the color. The products can be decolorized by conventional procedure, using bleaching earths, filtering clays, charcoal, or the like. A trace or small amount of catalyst, if present, can be removed for most purposes by the mere addition of a comparable amount of hydrochloric acid or by any other suitable means.

TABLE III

| Ex. No. | Composition before—Amount of OSC,[1] catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC[1] grams | Oxide used EtO grams | Catalyst NaOH, grams | Xylene solvent grams | Oxide used EtO grams[2] | Weight ratio | | | Max. pres., p. s. i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1c | 1b | 15.0# | 0 | 675 | 15.0# | 5.0# | 0.33 | | | 10-15 | 125-130 | ½ | Dark amber viscous liquid. |
| 2c | 1c | 15.0 | 5.0# | 675 | 15.0 | 10.0 | .67 | | | 10-15 | 125-130 | ½ | Do. |
| 3c | 2c | 15.0 | 10.0 | 675 | 15.0 | 15.0 | 1.0 | | | 10-15 | 125-130 | ½ | Do. |
| 4c | 3c | 15.0 | 15.0 | 675 | 15.0 | 20.0 | 1.33 | | | 10-15 | 125-130 | ¾ | Do. |
| 5c | 4c | 15.0 | 20.0 | 675 | 15.0 | 30.0 | 2.0 | | | 10-15 | 125-130 | 1½ | Very viscous. |
| 6c | 5c | 15.0 | 30.0 | 675 | 15.0 | 45.0 | 3.0 | | | 10-15 | 125-130 | 1¾ | Heavy viscous. |
| 7c | 6c | 7.5 | 22.5 | 337.5 | 7.5 | 30.0 | 4.0 | | | 10-15 | 125-130 | 1½ | Semi-fluid. |
| 8c | 7c | 7.5 | 30.0 | 337.5 | 7.5 | 45.0 | 6.0 | | | 10-15 | 125-130 | 1¾ | Do. |
| 9c | 8b | 30.0 | 0 | 450 | 30.0 | 5.0 | 0.167 | | | 10-15 | 125-130 | ¼ | Greenish black viscous liquid. |
| 10c | 9c | 30.0 | 5.0 | 450 | 30.0 | 10.0 | 0.333 | | | 10-15 | 125-130 | ½ | Do. |
| 11c | 10c | 30.0 | 10.0 | 450 | 30.0 | 15.0 | 0.50 | | | 10-15 | 125-130 | ½ | Do. |
| 12c | 11c | 30.0 | 15.0 | 450 | 30.0 | 30.0 | 1.0 | | | 10-15 | 125-130 | 1 | Do. |
| 13c | 12c | 15.0 | 15.0 | 225 | 15.0 | 30.0 | 2.0 | | | 10-15 | 125-130 | 1 | Very viscous. |
| 14c | 13c | 15.0 | 30.0 | 225 | 15.0 | 45.0 | 3.0 | | | 10-15 | 125-130 | 1½ | Do. |
| 15c | 14c | 15.0 | 45.0 | 225 | 15.0 | 60.0 | 4.0 | | | 10-15 | 125-130 | 1¾ | Semi-fluid. |

[1] Oxyalkylation-susceptible compound.
[2] In some instances weights change from gram basis to pound basis. Such change in unit is obvious.

TABLE IV

| Ex. No. | Composition before—Amount of OSC,[1] catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC[1] grams | Oxide used PrO grams | Catalyst NaOH, grams | Xylene solvent grams | Oxide used PrO grams[2] | Weight ratio | | | Max. pres., p. s. i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1d | 11b | 15.0# | 0# | 675 | 15.0# | 30.0# | | 2.0 | | 10-15 | 125-130 | 2 | Dark amber viscous fluid. |
| 2d | 1d | 15.0 | 30.0 | 675 | 15.0 | 60.0 | | 4.0 | | 10-15 | 125-130 | 2½ | Do. |
| 3d | 2d | 10.0 | 40.0 | 450 | 10.0 | 80.0 | | 8.0 | | 10-15 | 125-130 | 3½ | Do. |
| 4d | 3d | 5.0 | 40.0 | 225 | 5.0 | 75.0 | | 15.0 | | 10-15 | 125-130 | 3½ | Do. |
| 5d | 4d | 5.0 | 75.0 | 225 | 5.0 | 90.0 | | 18.0 | | 10-15 | 125-130 | 3 | Do. |
| 6d | 5d | 2.5 | 45.0 | 113 | 2.5 | 50.0 | | 20.0 | | 10-15 | 125-130 | 2 | Do. |
| 7d | 6d | 2.5 | 50.0 | 113 | 2.5 | 70.0 | | 28.0 | | 10-15 | 125-130 | 2¾ | Do. |
| 8d | 7d | 2.5 | 70.0 | 113 | 2.5 | 75.0 | | 30.0 | | 10-15 | 125-130 | 2½ | Do. |
| 9d | 16b | 20.0 | 0.0 | 900 | 20.0 | 60.0 | | 3.0 | | 10-15 | 125-130 | 3½ | Do. |
| 10d | 9d | 10.0 | 30.0 | 450 | 10.0 | 60.0 | | 6.0 | | 10-15 | 125-130 | 2½ | Do. |
| 11d | 10d | 10.0 | 60.0 | 450 | 10.0 | 90.0 | | 9.0 | | 10-15 | 125-130 | 2¾ | Do. |
| 12d | 11d | 5.0 | 45.0 | 225 | 5.0 | 90.0 | | 18.0 | | 10-15 | 125-130 | 4 | Do. |
| 13d | 12d | 4.0 | 72.0 | 180 | 4.0 | 80.0 | | 20.0 | | 10-15 | 125-130 | 2 | Do. |
| 14d | 13d | 4.0 | 80.0 | 180 | 4.0 | 100.0 | | 25.0 | | 10-15 | 125-130 | 3½ | Do. |
| 15d | 14d | 2.0 | 50.0 | 90 | 2.0 | 64.0 | | 32.0 | | 10-15 | 125-130 | 3 | Do. |

[1] Oxyalkylation-susceptible compound.
[2] In some instances weights change from gram basis to pound basis. Such change in unit is obvious.

TABLE V

| Ex. No. | OSC Ex. No. | OSC grams | Oxide used BuO grams | Catalyst, NaOH, grams | Xylene solvent grams | Oxide used BuO grams [2] | EtO to oxyalkylation suscept. cmpd. | PrO to oxyalkylation suscept. cmpd. | BuO to oxyalkylation suscept. cmpd. | Max. pres., p.s.i. | Max. temp., °C | Time of reaction, hrs. | End product—Color and physical state |
|---|---|---|---|---|---|---|---|---|---|---|---|---|---|
| 1e | 20b | 30.0# | 0.0# | 450 | 30.0# | 30.0# | | | 1.0 | 10-15 | 135-145 | 4½ | Black viscous liquid. |
| 2e | 1e | 20.0 | 20.0 | 300 | 20.0 | 40.0 | | | 2.0 | 10-15 | 135-145 | 2½ | Do. |
| 3e | 2e | 20.0 | 40.0 | 300 | 20.0 | 60.0 | | | 3.0 | 10-15 | 130-135 | 2¾ | Do. |
| 4e | 3e | 15.0 | 45.0 | 225 | 15.0 | 60.0 | | | 4.0 | 10-15 | 130-135 | 2½ | Do. |
| 5e | 4e | 10.0 | 40.0 | 150 | 10.0 | 50.0 | | | 5.0 | 10-15 | 130-135 | 3 | Do. |
| 6e | 34b | 40.0 | 0.0 | 675 | 40.0 | 20.0 | | | .5 | 10-15 | 135-140 | 2½ | Reddish black viscous liquid. |
| 7e | 6e | 30.0 | 15.0 | 450 | 30.0 | 30.0 | | | 1.0 | 10-15 | 130-135 | 2½ | Do. |
| 8e | 7e | 30.0 | 30.0 | 450 | 30.0 | 45.0 | | | 1.5 | 10-15 | 125-130 | 3 | Do. |
| 9e | 8e | 15.0 | 22.5 | 225 | 15.0 | 30.0 | | | 2.0 | 10-15 | 125-130 | 2 | Do. |
| 10e | 9e | 15.0 | 30.0 | 225 | 15.0 | 60.0 | | | 4.0 | 10-15 | 125-130 | 5 | Do. |
| 11e | 35b | 20.0 | 0.0 | 675 | 20.0 | 40.0 | | | 2.0 | 10-15 | 130-135 | 5 | Dark amber viscous liquid. |
| 12e | 11e | 20.0 | 40.0 | 675 | 20.0 | 60.0 | | | 3.0 | 10-15 | 125-130 | 3 | Do. |
| 13e | 12e | 10.0 | 30.0 | 338 | 10.0 | 60.0 | | | 6.0 | 10-15 | 125-130 | 4 | Do. |
| 14e | 13e | 5.0 | 30.0 | 169 | 5.0 | 50.0 | | | 10.0 | 10-15 | 125-130 | 3 | Do. |
| 15e | 14e | 5.0 | 50.0 | 169 | 5.0 | 100.0 | | | 20.0 | 10-15 | 125-130 | 6¾ | Do. |

[1] Oxyalkylation-susceptible compound.
[2] In some instances weights change from gram basis to pound basis. Such change in unit is obvious.

TABLE VI

| Ex. No. | OSC Ex. No. | OSC grams | Oxide used, as indicated, grams | Catalyst, NaOH, grams | Xylene solvent grams | Oxide used, as indicated, grams [2] | EtO to oxyalkylation suscept. cmpd.[3] | PrO to oxyalkylation suscept. cmpd.[3] | BuO to oxyalkylation suscept. cmpd.[3] | Max. pres., p.s.i. | Max. temp., °C | Time of reaction, hrs. | End product—Color and physical state |
|---|---|---|---|---|---|---|---|---|---|---|---|---|---|
| 1f | 6c | 2,250 | 0 BuO | 225 | 2,250 | 1,125 BuO | 3.0 | | .5 | 10-15 | 125-130 | 1½ | Dark amber heavy viscous liquid. |
| 2f | 1f | 2,250 | 1,125 | 225 | 2,250 | 2,250 | 3.0 | | 1.0 | 10-15 | 125-130 | 1½ | Viscous liquid. |
| 3f | 2f | 1,125 | 1,125 | 112.5 | 1,125 | 2,250 | 3.0 | | 2.0 | 10-15 | 125-130 | 2½ | Do. |
| 4f | 3f | 1,125 | 2,250 | 112.5 | 1,125 | 3,375 | 3.0 | | 3.0 | 10-15 | 125-130 | 3 | Do. |
| 5f | 4f | 675 | 2,025 | 67.5 | 675 | 6,750 | 3.0 | | 10.0 | 10-15 | 125-130 | 6 | Do. |
| 6f | 12d | 500 | 0 EtO | 50.0 | 500 | 250 EtO | 0.5 | 18.0 | | 10-15 | 125-130 | ½ | Do. |
| 7f | 6f | 500 | 250 | 50.0 | 500 | 500 | 1.0 | 18.0 | | 10-15 | 125-130 | ½ | Do. |
| 8f | 7f | 500 | 500 | 50.0 | 500 | 1,500 | 3.0 | 18.0 | | 10-15 | 125-130 | 1 | Do. |
| 9f | 8f | 250 | 750 | 25.0 | 250 | 1,500 | 6.0 | 18.0 | | 10-15 | 125-130 | 1½ | Do. |
| 10f | 9f | 250 | 1,500 | 25.0 | 250 | 2,000 | 8.0 | 18.0 | | 10-15 | 125-130 | 1½ | Do. |
| 11f | 15e | 1,125 | 0 PrO | 85.0 | 1,125 | 3,375 PrO | | 3.0 | 20.0 | 10-15 | 125-130 | 2½ | Do. |
| 12f | 11f | 750 | 2,250 | 85.0 | 750 | 3,750 | | 5.0 | 20.0 | 10-15 | 125-130 | 2¾ | Do. |
| 13f | 12f | 750 | 3,750 | 85.0 | 750 | 7,500 | | 10.0 | 20.0 | 10-15 | 125-130 | 4¾ | Do. |
| 14f | 13f | 375 | 3,750 | 42.5 | 375 | 5,625 | | 15.0 | 20.0 | 10-15 | 125-130 | 3 | Do. |
| 15f | 14f | 375 | 5,625 | 42.5 | 375 | 7,500 | | 20.0 | 20.0 | 10-15 | 125-130 | 3½ | Do. |

[1] Oxyalkylation-susceptible compound.
[2] In some instances weights change from gram basis to pound basis. Such change in unit is obvious.
[3] Weight ratio based on original oxyalkylation-susceptible compounds prior to any oxyalkylation.

TABLE VII

| Ex. No. | OSC Ex. No. | OSC grams | Oxide used, as indicated, grams | Catalyst, NaOH, grams | Xylene solvent grams | Oxide used, as indicated, grams [2] | EtO to oxyalkylation suscept. cmpd.[3] | PrO to oxyalkylation suscept. cmpd.[3] | BuO to oxyalkylation suscept. cmpd.[3] | Max. pres., p.s.i. | Max. temp., °C | Time of reaction, hrs. | End product—Color and physical state |
|---|---|---|---|---|---|---|---|---|---|---|---|---|---|
| 1g | 5f | 675 | 0 PrO | 67.5 | 675 | 3,375 PrO | 3.0 | 5.0 | 10.0 | 10-15 | 125-135 | 6 | Dark amber viscous liquid. |
| 2g | 1g | 405 | 2,025 | 40.5 | 405 | 4,050 | 3.0 | 10.0 | 10.0 | 10-15 | 125-135 | 4 | Do. |
| 3g | 2g | 202.5 | 2,025 | 20.25 | 202.5 | 2,430 | 3.0 | 12.0 | 10.0 | 10-15 | 125-135 | 2½ | Do. |
| 4g | 3g | 202.5 | 2,430 | 20.25 | 202.5 | 3,037.5 | 3.0 | 15.0 | 10.0 | 10-15 | 125-135 | 2½ | Do. |
| 5g | 4g | 202.5 | 3,037.5 | 20.25 | 202.5 | 3,645.0 | 3.0 | 18.0 | 10.0 | 10-15 | 125-135 | 3 | Do. |
| 6g | 10f | 250 | 0 BuO | 25.0 | 250 | 125 BuO | 8.0 | 18.0 | 0.5 | 10-15 | 125-135 | 2 | Do. |
| 7g | 6g | 250 | 125 | 25.0 | 250 | 250 | 8.0 | 18.0 | 1.0 | 10-15 | 125-135 | 2½ | Do. |
| 8g | 7g | 250 | 250 | 25.0 | 250 | 500 | 8.0 | 18.0 | 2.0 | 10-15 | 125-135 | 4 | Do. |
| 9g | 8g | 250 | 500 | 25.0 | 250 | 750 | 8.0 | 18.0 | 3.0 | 10-15 | 125-135 | 4 | Do. |
| 10g | 9g | 250 | 750 | 25.0 | 250 | 1,000 | 8.0 | 18.0 | 4.0 | 10-15 | 125-135 | 4¾ | Do. |
| 11g | 15f | 375 | 0 EtO | 42.5 | 375 | 375 EtO | 1.0 | 20.0 | 20.0 | 10-15 | 125-135 | 1 | Do. |
| 12g | 11g | 375 | 375 | 42.5 | 375 | 488.5 | 1.3 | 20.0 | 20.0 | 10-15 | 125-135 | ½ | Do. |
| 13g | 12g | 375 | 488.5 | 42.5 | 375 | 600.0 | 1.6 | 20.0 | 20.0 | 10-15 | 125-135 | ¾ | Do. |
| 14g | 13g | 250 | 400 | 28.5 | 250 | 500.0 | 2.0 | 20.0 | 20.0 | 10-15 | 125-135 | 1 | Very viscous. |
| 15g | 14g | 250 | 500 | 28.5 | 250 | 750.0 | 3.0 | 20.0 | 20.0 | 10-15 | 125-135 | 1¾ | Do. |

[1] Oxyalkylation-susceptible compound.
[2] In some instances weights change from gram basis to pound basis. Such change in unit is obvious.
[3] Weight ratio based on original oxyalkylation-susceptible compounds prior to any oxyalkylation.

PART 5

As to the use of conventional demulsifying agents reference is made to U. S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 6c, herein described.

Having thus described my invention, what I claim as new and desire to obtain by Letters Patent is:

1. The process of breaking petroleum emulsions of the water-in-oil type characterized by subjecting the emulsion to the action of a demulsifier including synthetic hydrophile products, said synthetic hydrophile products being the products resulting from a two-step manufacturing process consisting of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

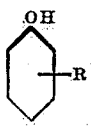

in which R is an aliphatic hydrocarbon radical having at least 4 and not more than 24 carbon atoms and substituted in the 2,4,6 position; (b) a basic secondary amine free from any primary amino radical and having not more than 32 carbon atoms in any group attached to any amino nitrogen radical and reactive towards pyruvic aldehyde; and (c) pyruvic aldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by a second step of reacting said condensate with an alpha-beta alkylene oxide having not more than 4 carbon atoms and selected from the class consisting of ethylene oxide, propylene oxide, butylene oxide, glycide and methylglycide.

2. The process of claim 1 with the proviso that there be an alkanol radical attached to at least one amino nitrogen atom.

3. The process of breaking petroleum emulsions of the water-in-oil type characterized by subjecting the emulsion to the action of a demulsifier including synthetic hydrophile products, said synthetic hydrophile products being the products resulting from a two-step manufacturing process consisting of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

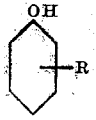

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom and reactive towards pyruvic; aldehyde; and (c) pyruvic aldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by a second step of reacting said condensate with an alpha-beta alkylene oxide having not more than 4 carbon atoms and selected from the class consisting of ethylene oxide, propylene oxide, butylene oxide, glycide and methylglycide.

4. The process of breaking petroleum emulsions of the water-in-oil type characterized by subjecting the emulsion to the action of a demulsifier including synthetic hydrophile products, said synthetic hydrophile products being the products resulting from a two-step manufacturing process consisting of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

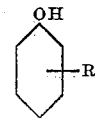

in which R is an aliphatic hydrocarbon radical having at least 4 and not more than 24 carbon atmos and substituted in the 2,4,6 position; (b) a basic hydroxylated secondary monoamine having not more than 32 carbon atoms in any group attached to the amino nitrogen atom and reactive towards pyruvic aldehyde; and (c) pyruvic aldehyde; said condensation reaction being conducted at a temperature sufficiently high to eliminate water and below the pyrolytic point of the reactants and resultants of reaction; with the added proviso that the condensation reaction be conducted so as to produce a significant portion of the resultant in which each of the three reactants have contributed part of the ultimate molecule; and with the further proviso that the resinous condensation product resulting from the process be heat-stable and oxyalkylation-susceptible; followed by a second step of reacting said condensate with an alpha-beta alkylene oxide having not more than 4 carbon atoms and selected from the class consisting of ethylene oxide, propylene oxide, butylene oxide, glycide and methylglycide.

5. The process of breaking petroleum emulsions of the water-in-oil type characterized by subjecting the emulsion to the action of a demulsifier including synthetic hydrophile products, said synthetic hydrophile products being the products resulting from a two-step manufacturing process consisting of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

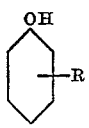

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom and reactive towards pyruvic aldehyde; and (c) pyruvic aldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a pyruvic-aldehyde-derived substituted methylene bridge connecting the amino nitrogen atom with a resin molecule; with the further proviso that the ratio of reactants be approximately 1, 2 and 1 respectively; and with the final proviso that the resinous condensation product resulting from the process be heat-stable and oxyalkylation-susceptible; followed by a second step of reacting said condensate with an alpha-beta alkylene oxide having not more than 4 carbon atoms and selected from the class consisting of ethylene oxide, propylene oxide, butylene oxide, glycide and methylglycide.

6. The process of breaking petroleum emulsions of the water-in-oil type characterized by subjecting the emulsion to the action of a demulsifier including synthetic hydrophile products, said synthetic hydrophile products being the products resulting from a two-step manufacturing process consisting of first condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

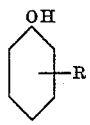

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom and reactive towards pyruvic aldehyde; and (c) pyruvic aldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a pyruvic-aldehyde-derived substituted methylene bridge connecting the amino nitrogen atom with a resin molecule; with the added proviso that the ratio of reactants be approximately 1, 2 and 1, respectively, with the further proviso that said procedure involve the use of a solvent; and with the final proviso that the resinous condensation product resulting from the process be heat-stable and oxyalkylation-susceptible; followed by a second step of reacting said condensate with an alpha-beta alkylene oxide having not more than 4 carbon atoms and selected from the class consisting of ethylene oxide, propylene oxide, butylene oxide, glycide and methylglycide.

7. The process of breaking petroleum emulsions of the water-in-oil type characterized by subjecting the emulsion to the action of a demulsifier including synthetic hydrophile products, said synthetic hydrophile products being the products resulting from a two-step manufacturing process consisting of first condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being derived by reaction between a difunctional monohydric phenol and formaldehyde; said resin being formed in the substantial absence of phenols of functionality greater than 2; said phenol being of the formula

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom and reactive towards pyruvic aldehyde; and (c) pyruvic aldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a pyruvic-aldehyde-derived substituted methylene bridge connecting the amino nitrogen atom with a resin molecule; with the added proviso that the ratio of reactants be approximately 1, 2 and 1, respectively; with the further proviso that said procedure involve the use of a solvent; and with the final proviso that the resinous condensation product resulting from the process be heat-stable and oxyalkylation-susceptible; followed by a second step of reacting said condensate with an alpha-beta alkylene oxide having not more than 4 carbon atoms and selected from the class consisting of ethylene oxide, propylene oxide, butylene oxide, glycide and methylglycide.

8. The process of breaking petroleum emulsions of the water-in-oil type characterized by subjecting the emulsion to the action of a demulsifier including synthetic hydrophile products, said synthetic hydrophile products being the products resulting from a two-step manufacturing process consisting of first condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being derived by reaction between a difunctional monohydric phenol and formaldehyde; said resin being formed in the substantial absence of phenols of functionality greater than 2; said phenol being of the formula

in which R is an aliphatic hydrocarbon radical having at least 4 and not more than 14 carbon atoms and substituted in the 2,4,6 position; (b) a basic hydroxylated secondary monoamine having not more than 32 carbon atoms in any group attached to the amino nitrogen atom and reactive towards pyruvic aldehyde; and (c) pyruvic aldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a pyruvic-aldehyde-derived substituted methylene bridge connecting the amino nitrogen atom with a resin molecule; with the added proviso that the ratio of reactants be approximately 1, 2 and 1, respectively; with the further proviso that said procedure involve the use of a solvent; and with the final proviso that the resinous condensation product resulting from the process be heat-stable and oxyalkylation-susceptible; followed by a second step of reacting said condensate with an alpha-beta alkylene oxide having not more than 4 carbon atoms and selected from the class consisting of ethylene oxide, propylene oxide, butylene oxide, glycide and methylglycide.

9. The process of breaking petroleum emulsions of the water-in-oil type characterized by subjecting the emulsion to the action of a demulsifier including synthetic hydrophile products, said synthetic hydrophile products being the products resulting from a two-step manufacturing process consisting of first condensing (a) an oxyethylation-susceptible, fusible, non-oxygenated organic solvent-soluble, water-insoluble, low-stage phenol-formaldehyde resin having an average molecular weight corresponding to at least 3 and not over 5 phenolic nuclei per resin molecule; said resin being derived by reaction between a difunctional monohydric phenol and formaldehyde; said resin being formed in the substantial absence of phenols of functionality greater than 2; said phenol being of the formula

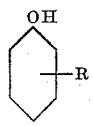

in which R is an aliphatic hydrocarbon radical having at least 4 and not more than 14 carbon atoms and substituted in the 2,4,6 position; (b) a basic hydroxylated secondary monoamine having not more than 32 carbon atoms in any group attached to the amino nitrogen atom and reactive towards pyruvic aldehyde; and (c) pyruvic aldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a pyruvic-aldehyde-derived substituted methylene bridge connecting the amino nitrogen atom with a resin molecule; with the added proviso that the ratio of reactants be approximately 1, 2 and 1, respectively; with the further proviso that said procedure involve the use of a solvent; and with the final proviso that the resinous condensation product resulting from the process be heat-stable and oxyalkylation-susceptible; followed by a second step of reacting said condensate with an alpha-beta alkylene oxide having not more than 4 carbon atoms and selected from the class consisting of ethylene oxide, propylene oxide, butylene oxide, glycide and methylglycide.

10. The process of breaking petroleum emulsions of the water-in-oil type characterized by subjecting the emulsion to the action of a demulsifier including synthetic hydrophile products, said synthetic hydrophile products being the products resulting from a two-step manufacturing process consisting of first condensing (a) an oxyethylation-susceptible, fusible, non-oxygenated organic solvent, water-insoluble, low-stage phenol-formaldehyde resin having an average molecular weight corresponding to at least 3 and not over 5 phenolic nuclei per resin molecule; said resin being derived by reaction between a difunctional monohydric phenol and formaldehyde; said resin being formed in the substantial absence of phenols of functionality greater than 2; said phenol being of the formula

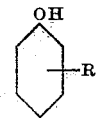

in which R is an aliphatic hydrocarbon radical having at least 4 and not more than 14 carbon atoms and substituted in the 2,4,6 position; (b) a basic hydroxylated secondary monoamine having not more than 32 carbon atoms in any group attached to the amino nitrogen atom and reactive towards pyruvic aldehyde; and (c) pyruvic aldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a pyruvic-aldehyde-derived substituted methylene bridge connecting the amino nitrogen atom with a resin molecule; with the added proviso that the ratio of reactants be approximately 1, 2 and 1, resceptively; with the further proviso that said procedure involve the use of a solvent; and with the fiinal proviso that the resinous condensation product resulting from the process be heat-stable and oxyalkylation-susceptible; followed by a second step of reacting said condensate with an alpha-beta alkylene oxide having not more than 4 carbon atoms and selected from the class consisting of ethylene oxide, propylene oxide, butylene oxide, glycide and methylglycide.

References Cited in the file of this patent
UNITED STATES PATENTS

| 2,454,545 | Bock et al. | Nov. 23, 1948 |
| 2,457,634 | Bond et al. | Dec. 28, 1948 |
| 2,507,910 | Keiser et al. | May 16, 1950 |
| 2,558,688 | Landa | June 26, 1951 |
| 2,589,200 | Monson | Mar. 11, 1952 |
| 2,695,887 | De Groote | Nov. 30, 1954 |